US011693805B1

(12) United States Patent
Dastidar et al.

(10) Patent No.: US 11,693,805 B1
(45) Date of Patent: *Jul. 4, 2023

(54) ROUTING NETWORK USING GLOBAL ADDRESS MAP WITH ADAPTIVE MAIN MEMORY EXPANSION FOR A PLURALITY OF HOME AGENTS

(71) Applicant: XILINX, INC., San Jose, CA (US)

(72) Inventors: Jaideep Dastidar, San Jose, CA (US); Millind Mittal, Saratoga, CA (US)

(73) Assignee: XILINX, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/373,620

(22) Filed: Jul. 12, 2021

Related U.S. Application Data

(63) Continuation of application No. 16/555,146, filed on Aug. 29, 2019, now Pat. No. 11,074,208.

(Continued)

(51) Int. Cl.
  *G06F 13/00* (2006.01)
  *G06F 13/40* (2006.01)
  (Continued)

(52) U.S. Cl.
  CPC ...... *G06F 13/4022* (2013.01); *G06F 9/30043* (2013.01); *G06F 13/1663* (2013.01);
  (Continued)

(58) Field of Classification Search
  CPC ............. G06F 13/4022; G06F 9/30043; G06F 13/1663; G06F 13/1668
  See application file for complete search history.

(56) References Cited

U.S. PATENT DOCUMENTS

| 6,608,813 B1 | 8/2003 | Chiussi et al. |
| 6,914,907 B1 | 7/2005 | Bhardwaj et al. |

(Continued)

FOREIGN PATENT DOCUMENTS

| EP | 2515294 A2 | 10/2012 |
| JP | 2014160502 A | 9/2014 |
| WO | 2015099730 A1 | 7/2015 |

OTHER PUBLICATIONS

U.S. Appl. No. 15/967,473, filed Apr. 30, 2018, Entitled: "Circuit for and Method of Providing a Programmable Connector of an Integrated Circuit Device".

(Continued)

*Primary Examiner* — Tammara R Peyton
(74) *Attorney, Agent, or Firm* — Patterson + Sheridan, LLP

(57) ABSTRACT

An adaptive memory expansion scheme is proposed, where one or more memory expansion capable Hosts or Accelerators can have their memory mapped to one or more memory expansion devices. The embodiments below describe discovery, configuration, and mapping schemes that allow independent SCM implementations and CPU-Host implementations to match their memory expansion capabilities. As a result, a memory expansion host (e.g., a memory controller in a CPU or an Accelerator) can declare multiple logical memory expansion pools, each with a unique capacity. These logical memory pools can be matched to physical memory in the SCM cards using windows in a global address map. These windows represent shared memory for the Home Agents (HAs) (e.g., the Host) and the Slave Agents (SAs) (e.g., the memory expansion device).

20 Claims, 8 Drawing Sheets

Related U.S. Application Data

(60) Provisional application No. 62/878,302, filed on Jul. 24, 2019.

(51) Int. Cl.
*G06F 13/16* (2006.01)
*G06F 9/30* (2018.01)

(52) U.S. Cl.
CPC .. *G06F 13/1668* (2013.01); *G06F 2209/5011* (2013.01); *G06F 2213/0038* (2013.01)

(56) References Cited

U.S. PATENT DOCUMENTS

| | | | |
|---|---|---|---|
| 8,422,493 | B2 | 4/2013 | Kono et al. |
| 8,787,374 | B2 | 7/2014 | Maeda et al. |
| 9,306,845 | B2 | 4/2016 | Kumagai et al. |
| 9,336,142 | B2 | 5/2016 | Ghai et al. |
| 9,391,835 | B2 | 7/2016 | Aoshima et al. |
| 9,525,591 | B2 | 12/2016 | Yasuda et al. |
| 9,794,194 | B2 | 10/2017 | Yasuda et al. |
| 10,097,466 | B2 | 10/2018 | Tang et al. |
| 10,409,743 | B1 | 9/2019 | Mittal et al. |
| 10,445,659 | B2 | 10/2019 | Bowers et al. |
| 10,528,513 | B1 | 1/2020 | Chan et al. |
| 10,698,824 | B1 | 6/2020 | Mittal et al. |
| 10,698,842 | B1 | 6/2020 | Dastidar et al. |
| 11,074,208 | B1 * | 7/2021 | Dastidar ............. G06F 13/1668 |
| 2007/0294485 | A1 | 12/2007 | Zeffer et al. |
| 2009/0006668 | A1 | 1/2009 | Vasudevan et al. |
| 2016/0041936 | A1 | 2/2016 | Lee et al. |
| 2017/0060606 | A1 | 3/2017 | Hollinger |
| 2017/0068626 | A1 | 3/2017 | Lais et al. |
| 2018/0131637 | A1 | 5/2018 | Hughes et al. |
| 2018/0287964 | A1 | 10/2018 | Gray |
| 2019/0004990 | A1 | 1/2019 | Van Doren et al. |
| 2019/0042292 | A1 | 2/2019 | Palermo et al. |
| 2019/0042425 | A1 | 2/2019 | Shifer |
| 2019/0042455 | A1 | 2/2019 | Agarwal et al. |
| 2019/0042518 | A1 | 2/2019 | Marolia et al. |
| 2019/0065426 | A1 | 2/2019 | Das Sharma et al. |
| 2019/0102295 | A1 | 4/2019 | Sury et al. |
| 2019/0102303 | A1 | 4/2019 | Wang et al. |
| 2019/0102311 | A1 | 4/2019 | Gupta et al. |
| 2020/0042446 | A1 | 2/2020 | Mittal et al. |
| 2020/0044895 | A1 | 2/2020 | Mittal et al. |
| 2020/0125384 | A1 | 4/2020 | Serebrin et al. |
| 2020/0133898 | A1 | 4/2020 | Therene et al. |
| 2020/0213228 | A1 | 7/2020 | Cheng |

OTHER PUBLICATIONS

U.S. Appl. No. 16/025,762, filed Jul. 2, 2018, Entitled: "Logical Transport Overlayed Over a Physical Transport Having a Tree Topology".

U.S. Appl. No. 16/053,384, filed Aug. 2, 2018, Entitled: "Logical Transport Over a Fixed PCIE Physical Transport Network".

U.S. Appl. No. 16/141,704, filed Sep. 25, 2018, Entitled: "Scalable Coherence Management Independent of Transport Protocol".

U.S. Appl. No. 16/053,488, filed Aug. 2, 2018, Entitled: "Hybrid Precise and Imprecise Cache Snoop Filtering".

U.S. Appl. No. 16/208,260, filed Dec. 3, 2018, Entitled: "Scratchpad Memory Management in a Computing System".

Yunlong Xu et al: "Lock-based Synchronization for GPU Architectures", CF' 16 Proceedings of the ACM International Conference on Computing Frontiers, ACM, 2 Penn Plaza, Suite 701 New York NY 10121-0701 USA, May 16, 2016, pp. 205-213, XP058259517, DOI: 10.1145/2903150.2903155, ISBN: 978-1-4503-4128-8 p. 205-p. 207.

David Koenen et al: "United States: Cadence Introduces First Interface and Verification IP solution for CCIX to Advance New Class of Datacenter Servers" Mena Report, May 5, 2017, XP055483333, London. Retrieved from teh the Internet: URL:http://www.armtechform.com./attached/article/c7_ccix20171226161995.pdf pp. 11-p. 15.

* cited by examiner

ROUTING NETWORK USING GLOBAL ADDRESS MAP WITH ADAPTIVE MAIN MEMORY EXPANSION FOR A PLURALITY OF HOME AGENTS

CROSS-REFERENCE TO RELATED APPLICATION

The present application claims the benefit of U.S. Provisional application Ser. No. 16/555,146 filed Aug. 29, 2019, the contents of which are hereby incorporated by reference in its entirety.

TECHNICAL FIELD

Examples of the present disclosure generally relate to mapping expansion capable home agents to expansion memory devices in a coherent memory environment.

BACKGROUND

Server CPU-Accelerator systems, such as those enabled by the Compute eXpress Link (CXL), Cache Coherent Interconnect for Accelerators (CCIX), QuickPath Interconnect/Ultra Path Interconnect (QPI/UPI), Infinity Fabric, NVLink™, and Open Coherent Accelerator Processor Interface (OpenCAPI) connected SoCs are all inherently hardware cache-coherent systems—i.e. the hardware maintains a universal, coherent view of accessed, modified, and cached data regardless of whether the processor or accelerator is acting as the producer or consumer of the data and metadata (information about the data) and regardless whether the memory is directly attached to the Server or remotely attached with for example, the CCIX or CXL protocol.

Meanwhile, Storage Class Memory (SCM) cards, with comparably lower latencies than hard drives as well as higher capacity than main memory, are increasingly bridging the gap between low latency DRAMs (e.g., main memory) that have limited capacity (GB) to high latency disk/non-volatile memory that have large capacities (TB) (e.g., hard drives). These SCM cards allow for the server to not be limited to the capacity and volatile nature of conventional memory technologies such as DDR and High Bandwidth Memory (HBM).

CPU and Accelerator implementations without protocols such as CCIX or CXL, standardize on one type of standard memory technology, such as DDR or HBM, for integration in their SoCs or CPU and Accelerator implementations and may have their own proprietary technology, such as MRAM or 3-D Crosspoint.

CPU SoCs that are built with the attributes summarized above have physical constraints to their memory capacity either due to die size constraints on monolithic dies where only a limited number of memory controllers can be offered, or pin/port constraints, even for chiplet based designs, that allow only a limited number of (DDR or HBM) memory controller pins from a single socket. Meanwhile, SCM based devices have one of two options: be implemented with the SCM interface built into the CPU SoC using a proprietary memory protocol or be implemented using an industry or consortium protocol such as CCIX or CXL.

There are several disadvantages with this approach. First, proprietary schemes do not allow other industry SCM innovators to participate. Second, industry or consortium protocol attached SCM schemes may be dimensioned such that, depending on the Host SoC implementation, the amount of SCM memory available in a physical CCIX or CXL card is oversubscribed or undersubscribed due to mismatches between the memory expansion capabilities of the Host (the Home Agent), and the memory capacity of the SCM card (the Slave Agent).

SUMMARY

Techniques for managing memory expansion devices. One example is a method that includes identifying a plurality of memory expansion devices, identifying a plurality of home agents capable of coherently managing the plurality of memory expansion devices, identifying a type of least one memory pool in each of the plurality of memory expansion devices, identifying the plurality of home agents that can manage that type, generating a global address map comprising a plurality of windows based on the type of the at least one memory pool in each of the plurality of memory expansion devices and the plurality of home agents that can manage that type where each window maps at least one of the plurality of memory expansion devices to at least one of the plurality of home agents, and accessing, by the plurality of home agents, the memory pools in the plurality of memory expansion devices.

Another example is a computing system that includes a plurality of memory expansion devices comprising different types of memory pools, a plurality of home agents configured to coherently manage the plurality of memory expansion devices based on the different types of memory pools, and a global address map comprising a plurality of windows, wherein each window maps at least one of the plurality of memory expansion devices to at least one of the plurality of home agents.

Another example is a method that includes identifying a plurality of memory expansion devices, identifying a plurality of home agents capable of coherently managing the plurality of memory expansion devices, identifying a size of at least one memory pool in each of the plurality of memory expansion devices, identifying an amount of memory that can be managed by each of the plurality of home agents, generating a global address map comprising a plurality of windows based on the size of at least one memory pool in each of the plurality of memory expansion devices and the amount of memory that can be managed by each of the plurality of home agents where each window maps at least one of the plurality of memory expansion devices to at least one of the plurality of home agents, and accessing, by the plurality of home agents, the memory pools in the plurality of memory expansion devices.

BRIEF DESCRIPTION OF DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

DETAILED DESCRIPTION

Figure 1:
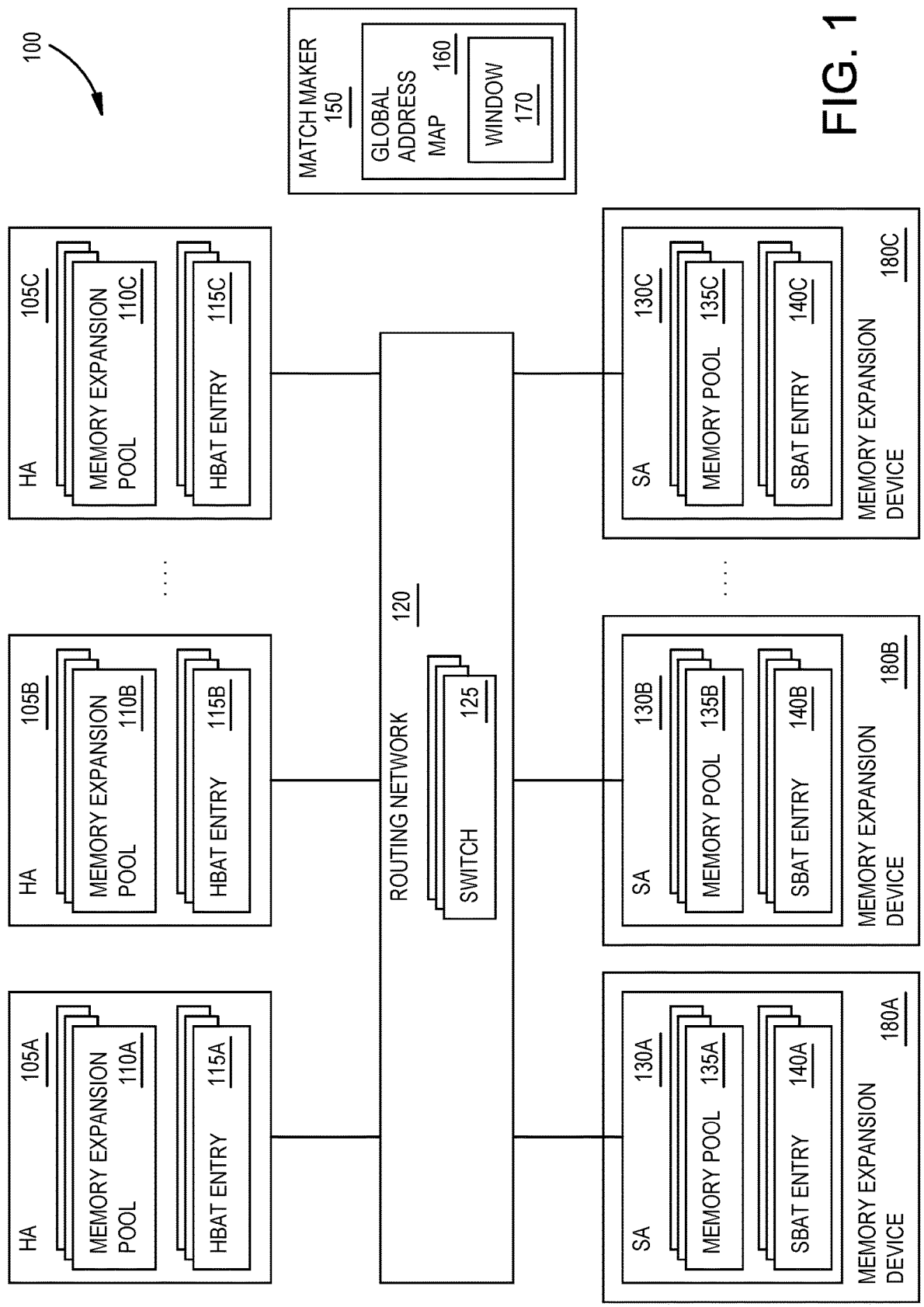
FIG. 1 is a block diagram of a computing system that maps home agents to slave agents implemented using memory expansion devices, according to an example.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the various features. They are not intended as an exhaustive description or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

An adaptive memory expansion scheme is proposed, where one or more memory expansion capable Hosts or Accelerators can have their memory mapped to one or more memory expansion devices. The embodiments herein are applicable to any computing system including a heterogeneous compute environment where a cache coherent protocol is used, such as the CXL, CCIX, QPI/UPI, AMD Infinity Fabric, NVLink, and OpenCAPI (particularly the CXL.mem extensions intended for main memory expansion). Referring particular to CXL and CCIX, the embodiments herein apply to multi-socket CCIX or CXL (Processor) hosts, adaptively expanding their memory from one host socket to multiple memory expansion CCIX or CXL cards (e.g., types of memory expansion devices). The embodiments herein also apply to multi-socket CCIX or CXL hosts adaptively expanding their memory to a single memory expansion CCIX or CXL card.

The embodiments below describe discovery, configuration, and mapping schemes that allow independent SCM implementations and CPU-Host implementations to match their memory expansion capabilities. As a result, a memory expansion host (e.g., a memory controller in a CPU or an Accelerator) can declare multiple logical memory expansion pools, each with a unique capacity. These logical memory pools can be matched to physical memory in the SCM cards using windows in a global address map. These windows represent shared memory for the Home Agents (HAs) (e.g., the Host) and the Slave Agent (SAs) (e.g., the memory expansion device). Multiple ports/pins and memory expansion pools in the HA can be mapped to the same window. Similarly, multiple memory pools in the memory expansion devices (and multiple memory expansion devices) can be mapped to the same window. Put differently, the memory expansion destination (e.g., a memory expansion device) can also declare multiple logical memory expansion destinations, each also with a unique capacity or size.

Unlike prior techniques, this invention does not rely on both static capacity mapping or one-to-one physical Host to memory expansion destination mapping. Instead, the embodiments herein create a dynamic mapping and remapping scheme between multiple candidate Memory Expansion Hosts (e.g., HAs), and multiple candidate Memory Expansion Destinations (e.g., Memory Expansion Devices or SAs). The system strives for an optimal capacity match between the Hosts and Destinations, efficient use of their resources, and also an improvement in the overall performance of the system since the scheme allows for maximum memory expansion capability across the system regardless of the physical limitations of the specific components within the system.

FIG. 1 is a block diagram of a computing system 100 that maps HAs to SAs implemented using memory expansion devices, according to an example. The computing system 100 includes a plurality of HAs 105 coupled to a plural of SAs 130 via a routing network 120. The routing network 120 includes one or more switches 125 that communicatively couple the HAs 105 to the SAs 130. However, in other embodiments, the HAs 105 and the SAs 130 may be directly connected to each other (e.g., through one or more hard wired routing traces).

The HAs 105 each include one or more memory expansion pools 110 and Home Agent Base Address Table (HBAT) entries 115. The memory expansion pools 110 represent the amount of memory that can be externally managed by the HA 105. For example, the HA 105A may have a first memory expansion pool 110A representing an 8 gigabyte memory block that can be managed by the HA 105A. In another example, the HA 105A may have first and second memory expansion pools 110A that each represent two 8 gigabyte (or two 4 gigabyte) logical memory blocks. For example, the memory expansion pools 110 may include data describing how many, and what size, external memory blocks (which are physically located on the memory expansion devices 180) can be managed the HA 105.

In one embodiment, the HA 105 includes one HBAT entry for each memory expansion pool. The HBAT entries 115 are control structures that map one of the memory expansion pools (e.g., a logical block of memory) to a window 170 in a global address map 160 which is described later. For example, the HBAT entries 115 may include memory addresses (or a range of memory addresses) in the global address map 160 that are assigned to its corresponding memory expansion pool 110.

In one embodiment, the HA 105 is a memory controller. The HA 105 may be integrated into a processor (e.g., a CPU) or an Accelerator implemented in a field programmable gate array (FPGA) or system-on-a-chip (SoC). In any case, the HA 105 may be part of an integrated circuit (IC). The HA 105 can be any hardware element that coherently manages external memory.

The memory expansion devices 180 include SAs 130 which in turn include one or more memory pools 135 (also referred to as MemPool) and corresponding Slave Agent Base Address Table (SBAT) entries 140. The memory pools 135 represent the physical memory in the SAs 130 and the memory expansion devices 180. For example, the SA 130A may include a first memory pool 135 with a capacity of 4 gigabytes. The SA 130B may include two memory pools 135 each with a capacity of 8 gigabytes. As discussed later, the memory pools 135 are mapped to the HAs 105. Specifically, the memory pools 135 are assigned to the memory expansion pools 110 so that the physically memory pools 135 can be managed and accessed by the HAs 105 (e.g., to perform load/store operations).

In one embodiment, there is a one-to-one relationship between the SBAT entries 140 in an SA 130 and the memory pools 135. The SBAT entries 140 are control structures which map a corresponding memory pool 135 to a window 170 in the global address map 160.

In one embodiment, the memory expansion devices 180 are SCM cards, but can be any external memory that is pluggable or attachable into the computing system 100. The memory expansion devices 180 are separate from the HAs 105 but may be enclosed in the same structure or different structure as the HAs 105. In one embodiment, a coherent protocol for heterogeneous compute elements, such as CCIX, CXL, QPI/UPI, AMD Infinity Fabric, NVLink, or OpenCAPI is used to communicatively couple the SA 130 to the HA 105 so the memory pools 135 in the SAs 130 can be coherently managed by the HAs 105.

The computing system 100 also includes a match maker 150 which generates the global address map 160 and its memory windows 170. That is, using the techniques below, the match maker 150 (e.g., a software application, a hardware element, or combinations thereof) identifies the capabilities of each of the HAs 105 (using information contained in the memory expansion pools 110), the number and size of the memory pools 135 in the SAs 130, and matches them to form windows 170. In some embodiments, on or multiple HAs are mapped to the same window 170. Similarly, one or more memory pools 135 may be mapped to the same window 170. Thus, the HAs 105 can have any number of memory expansion pools 110 that represent different sizes of logical memory blocks and the memory expansion devices 180 can have any number of memory pools 135 with any different sizes and the match maker 150 can mix-and-match the memory pools 135 to satisfy the capabilities of the HAs 105. In that way, the computing system 100 can include HAs 105 and SAs 130 from different vendors, manufactures, and different models and still efficiently map the HAs and SAs 130 to the windows 170 so the memory is not oversubscribed or undersubscribed.

Figure 2:
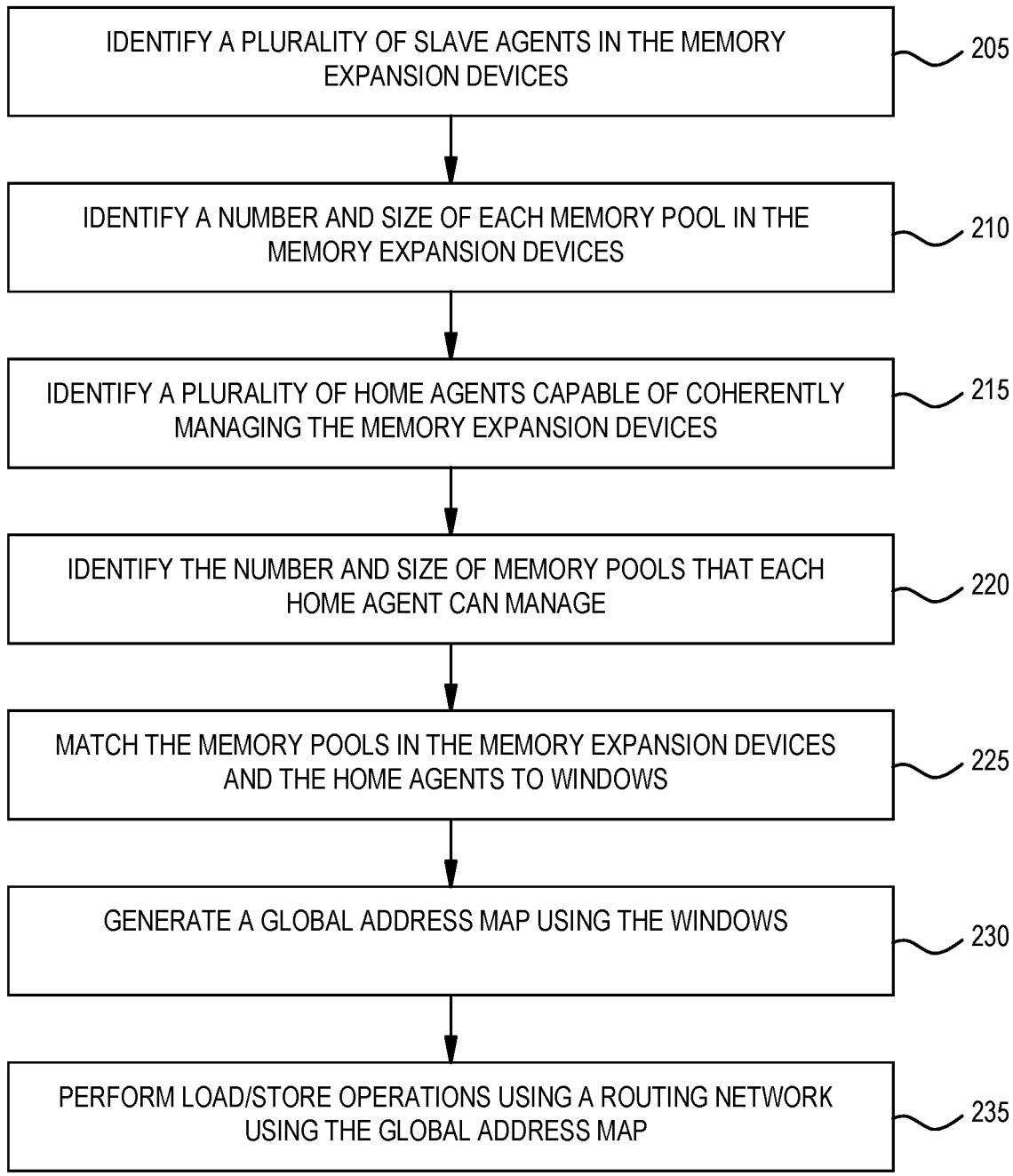
FIG. 2 is a flowchart for matching home agents to memory expansion devices, according to an example.

FIG. 2 is a flowchart of a method 200 for matching home agents to memory expansion devices, according to an example. For clarity, the blocks of method 200 are discussed in tandem with FIG. 3 which illustrates a logical mapping between home agents and slave agents, according to an example. At block 205, the match maker identifies a plurality of SAs in the memory expansion devices. Each memory expansion can include one or more SAs which are represented by SAs 1-A in FIG. 3.

At block 210, the match maker identifies a number and size of each memory pool in the memory expansion devices. Each SA can include one or more memory pools (or MemPool in FIG. 3). Thus, there may be more MemPools 1-B in the computing system than SAs 1-A (i.e., B can be greater than A). That is, the SAs can declare 1 to B number Memory Pool Capabilities & Status data structures. In one embodiment, each Slave Agent declares at least one Memory Pool.

The memory pools declare to the match maker their memory attributes including their size and memory type (e.g., volatile or non-volatile). As shown in FIG. 1, each of the memory pools have corresponding SBAT entries.

Figure 3:
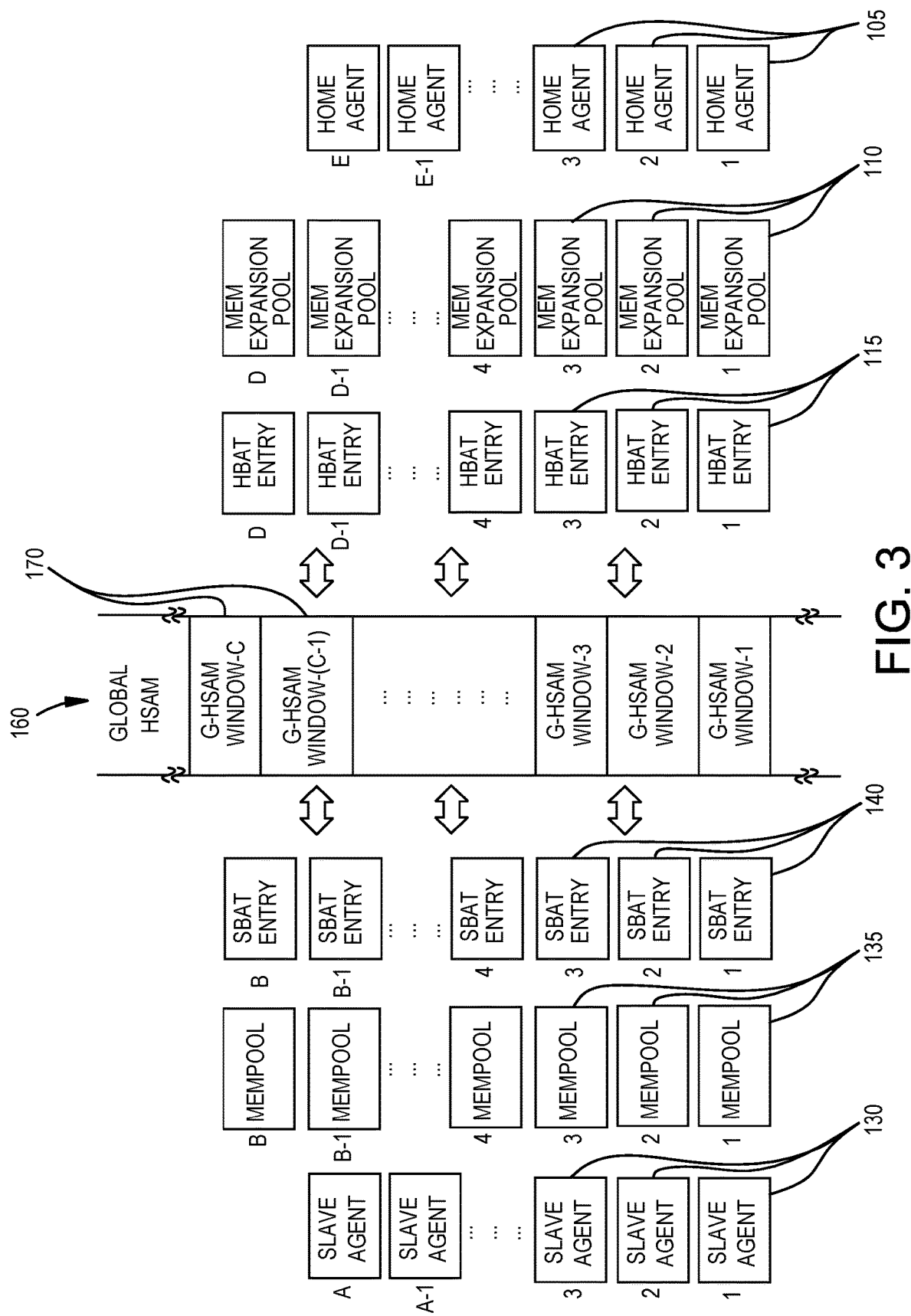
FIG. 3 illustrates a logical mapping between home agents and slave agents, according to an example.

At block 215, the match maker identifies a plurality of HAs capable of coherently managing external memory (e.g., the SAs on the memory expansion devices). As mentioned above, these HAs can be memory controllers in processors or accelerator devices and are represented in FIG. 3 as HAs 1-E.

At block 220, the match maker identifies the number and size of memory pools that each HA can manage. This information may be declared in the memory expansion pools. For example, the HA may be capable of managing only one 8 gigabyte memory pool. Alternatively, the HA may have two ports and can manage two 8 gigabyte memory pools. As such, the number of Memory Expansion Pools (e.g., Pools 1-D) can differ from the number of HAs. Further, the HA may prefer a particular type of memory pool—nonvolatile rather than volatile.

At block 225, the match maker matches the memory pools in the memory expansion devices and the HAs to windows. For example, if the HA can manage one 8 gigabyte memory, it may be mapped to the same window as two memory pools in an SA that are 4 gigabytes each. Alternatively, the HA can be mapped to the same window as a first SA with a 4 gigabyte memory pool and a second SA with a 4 gigabyte memory pool. Thus, one HA can be mapped to multiple SAs. In another example, multiple HAs are mapped to the same window as a single SA. For example. first and second HAs that are each capable of managing an 8 gigabyte memory block may be mapped to the same window as a single SA with an 16 gigabyte memory pool. In yet another example, multiple HAs and multiple SAs can be mapped to the same window. Thus, as shown in FIG. 3, there can be a different number of windows 1-C than MemPools 1-B and Mem Expansion Pools 1-D. With this flexibility, the match maker can generate windows that provide more efficient use of the memory pools than a one-to-one match as used in previous solutions.

In addition to considering size when matching the memory expansion pools in the HA to the memory pools in the SA, the match maker can consider the type of memory detailed in the information contained in the memory expansion pools. For example, some HAs may want to manage nonvolatile external memory pools (or a specific type of nonvolatile memory—e.g., resistive memory). The match maker can select an SA with the same type of memory to match to the same window as the HA.

At block 230, the match maker generates the global address map using the windows. In one embodiment, the global address map is within the system address space. The global address map provides an intermediate map between the HAs and SAs so that different numbers of HAs and SAs can be mapped to the same window using their corresponding SBAT and HBAT entries.

In one embodiment, the memory in the 1-to-B memory pools is mapped to the HA System Address Map (G-HSAM) in FIG. 3 by programming the SBAT Entry control structures. An SBAT Entry can be programmed with the addresses contained in one G-HSAM window, or multiple SBAT Entries can be programmed with the addresses contained in one G-HSAM Window, thus C can be less than or equal to B.

Similarly, the memory in the 1-to-D memory expansion pools is mapped to the G-HSAM by programming the HBAT Entry control structures. An HBAT Entry can be programmed with the addresses contained in one G-HSAM window, or multiple HBAT Entries can be programmed with the addresses contained in one G-HSAM window, thus C can be less than or equal to D.

In one embodiment, multiple BAT Entries are mapped to a single G-HSAM window. The expansion memory for multiple HAs can come from a single SA because multiple HBAT memory expansion entries can be programmed with the addresses contained in one G-HSAM window, while at the same time, a single SBAT Entry can be programmed with the addresses contained in the same G-HSAM window. The expansion memory for a single HA can come from multiple SA because multiple SBAT entries can be programmed with the non-overlapping addresses contained in one G-HSAM window, while at the same time, a single HBAT memory expansion entry can be programmed with the addresses contained in the same G-HSAM window.

At block 235, the computing system performs load/store operations using a routing network configured using the global address map. That is, the global address map can configure the HBAT and SBAT entries, along with the routing network, so that requesting agents (RAs) can access the memory pools in the SAs which are managed by the HAs. That is, the HAs permit RAs to perform load/store operations using the memory expansion devices. The switches in the routing network may have routing information so that a particular SA is managed by a particular HA (or multiple HAs) as defined in the global address map—e.g., if the HA and SA are mapped to the same window in the global address map.

Figure 4:
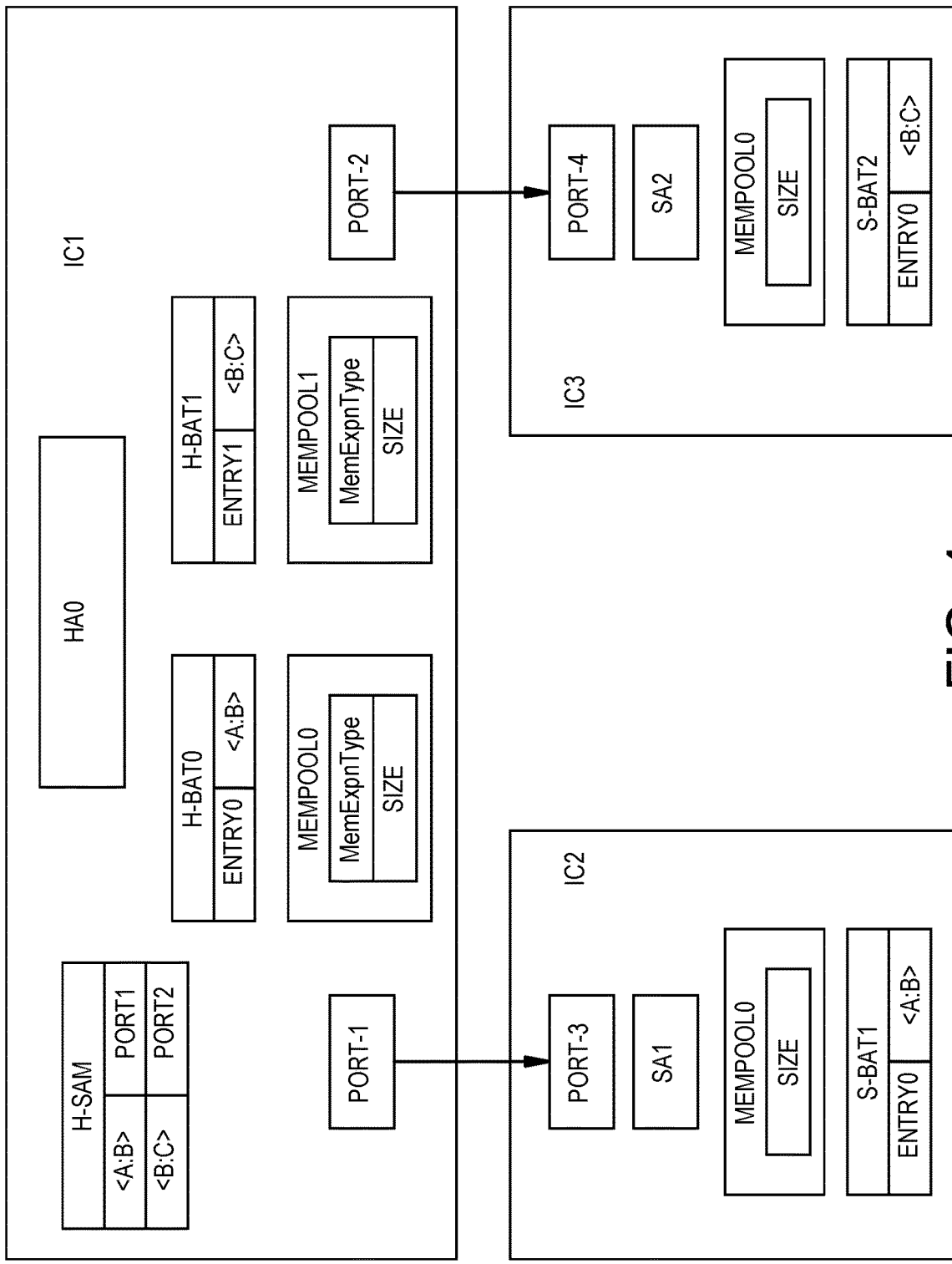
FIGS. 4-7 illustrate hardware implementations for mapping home agents to slave agents, according to an example.

In one embodiment, FIG. 3 shows the G-HSAM (e.g., a global address map) generated within a system address space that is generated by CCIX Configuration Software after identifying the capabilities of the CCIX Memory Devices as well as the addressing capabilities of the CCIX Requesting Devices. FIG. 4 illustrates G-HSAM and its relation to HAs, MemPools, and HA Base Address Table (HBAT) Entries.

For a given CCIX topology with 1-to-E number of HAs discovered, a corresponding 1-to-D number of memory pool capabilities and status data structures are declared across the HAs. In one embodiment, each HA declares at least one Memory Pool Entry, thus D is greater than or equal to E.

The 1-to-D number of memory expansion pools declare the memory attributes hosted by their corresponding HAs. Memory attributes declared include the memory size, memory type, and addressing capability of the memory expansion pool.

The 1-to-D number of memory expansion pool capabilities and status data structures have a one-to-one relationship with their corresponding 1-to-D number of HBAT entry control structures.

As mentioned above at block 230, the match maker generates a G-HSAM with 1-to-C number of G-HSAM windows. In one embodiment, each G-HSAM window is defined by a 4 GB aligned Start and End Address, but this is design choice and is not required.

The memory in the 1-to-D memory expansion pools are mapped to the G-HSAM by programming the HBAT Entry control structures. Depending on the attributes declared in the 1-to-D number of memory expansion pool entries, an HBAT Entry can be programmed with the addresses contained in one G-HSAM Window, or multiple HBAT Entries can be programmed with the addresses contained in one G-HSAM window, thus C is less than or equal to D.

Figure 5:
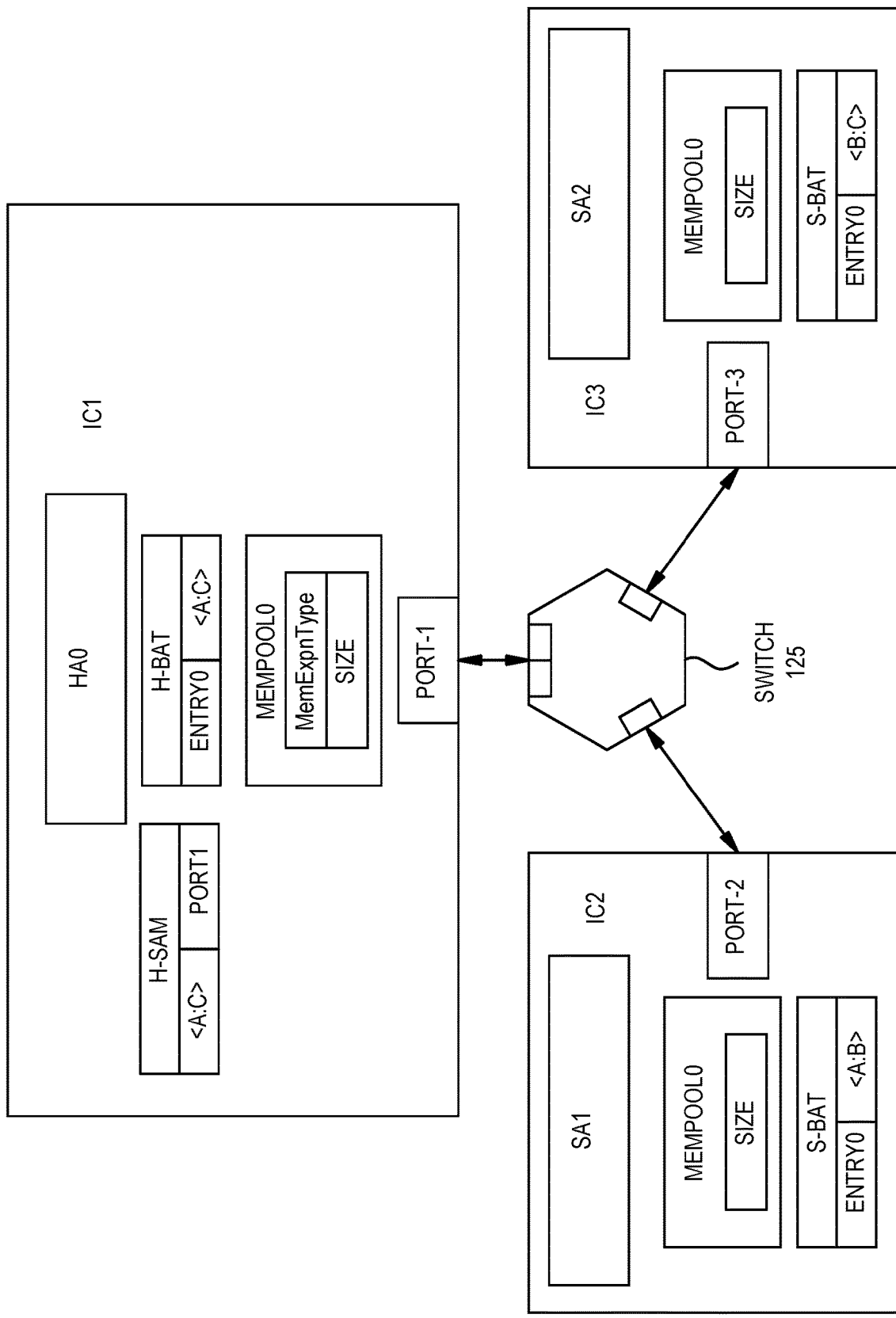
Figure 6:
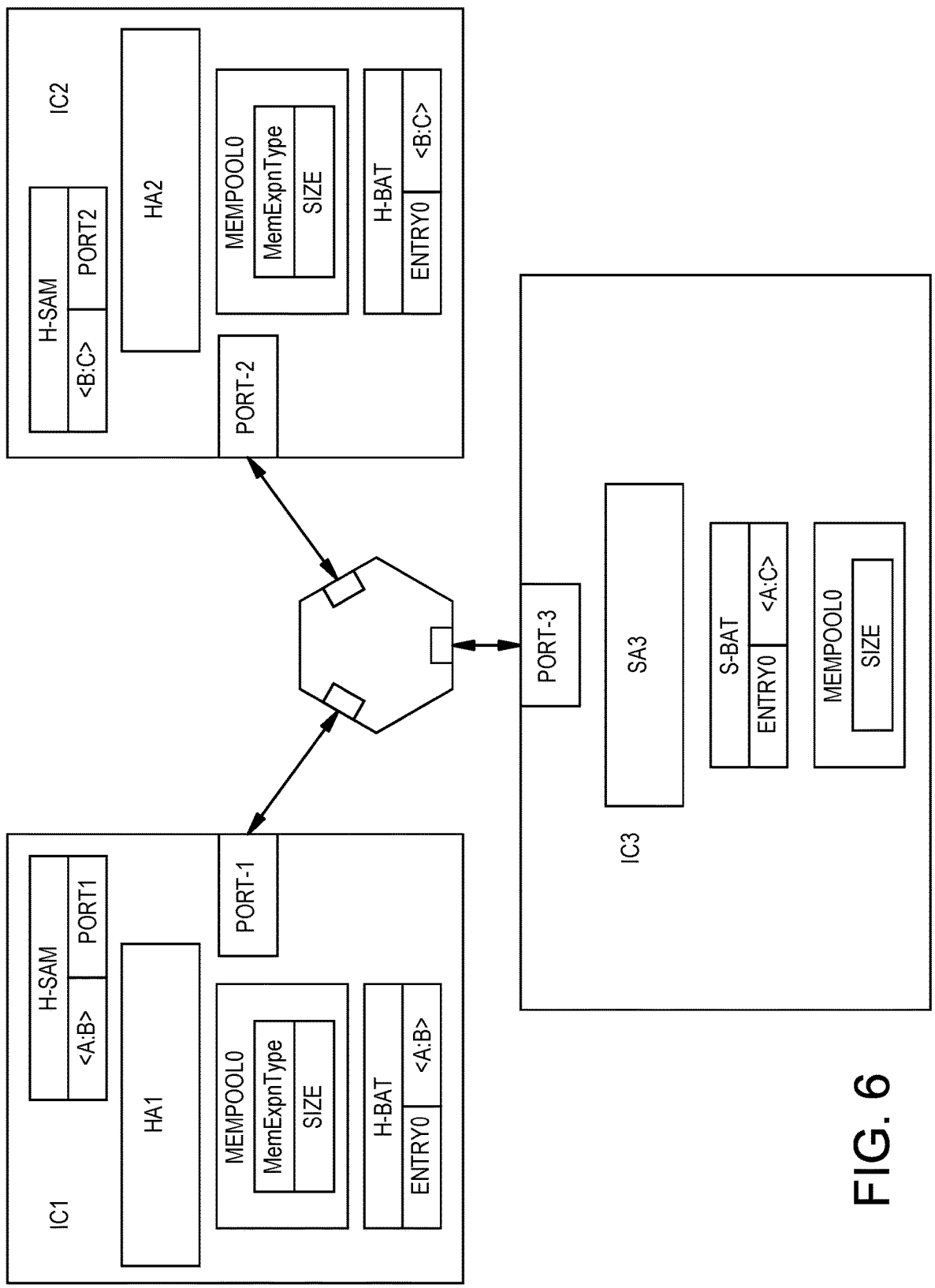

FIGS. 4-6 illustrate hardware implementations for mapping home agents to slave agents, according to an example. FIG. 4 illustrates a physical implementation of one HA (HA0) mapped to the same window as two SAs (SA1 and SA2). The IC1 includes a HA that can manage two separate logical memory pools (MemPool0 and MemPool1). For example, MemPool0 represents a 4 gigabyte logical memory block while MemPool1 represents an 8 gigabyte logical memory block. The IC1 also includes corresponding HBAT entries (H-BAT0 and H-BAT1) which assigns the address range of A:B to MemPool0 and the address range of B:C to MemPool1. These address ranges can correspond to the same window in the global address map (with the address range of A:C) or to two windows (one with address range A:B and another with range B:C).

In any case, the MemPool0 for HA0 maps to the MemPool0 in IC2 corresponding to the SA1 while the MemPool1 for HA0 maps to the MemPool0 in IC3. The IC2 includes an SBAT entry (S-BAT1) which maps the MemPool0 to the same address range (A:B) as the MemPool0 in IC1 while IC3 has an SBAT entry (S-BAT2) that maps the MemPool0 to the same address range (B:C) as the MemPool1 in IC1.

For example, the size of the MemPool0 in IC1 and MemPool0 in IC2 may be the same and the size of the MemPool1 in 11 and MemPool1 in IC3 may be the same.

Moreover, in FIG. 4, there is no routing network between the ICs. That is, 1 is hardwired to IC2 via ports 1 and 3 and to IC3 via ports 2 and 4. Thus, a switchable routing network is not required; instead, the embodiments herein can be accomplished using a hard-wired routing network as shown in FIG. 4.

FIG. 4 also includes a system address map (SAM) table that, in one embodiment, resolves a destination CCIX component (CCIX PortID) for a given address. The SAM table is referenced by CCIX ports and CCIX agents for address routed packets. The SAM table structure contains one or more entries. The SAM table size along with the SAM table type supported by the CCIX component indicates the number of SAM entries available for setup and the index into each SAM entry.

In one embodiment, each SAM entry has a valid bit to indicate whether that entry is enabled. Software sets the valid bit for non-contiguous SAM entries. The address range mapped by a particular valid SAM entry does not overlap with an address range mapped in any other valid SAM entry. However, when the HA and SA address spaces are independent of each other, overlap of address name-space between HBAT/RSAM and SBAT/HSAM Tables is allowed.

Memory pool capability data (which can be stored as part of the memory pools) describes the size, type, and attributes of the memory pools. The Base Address Table (BAT) is the corresponding control structure associated with the memory pool capability data. The BAT is used to resolve the destination memory pool for a given address in the SAM.

Memory pool capability data may be declared by HAs and SAs (e.g., as part of the memory expansion pool in the HA and as part of the memory pool in the SA). Similarly, the corresponding BAT control structure is referenced by HAs and SAs. There may be a one-to-one correspondence between memory pool capability data stored in the memory expansion pool or memory pool and a BAT control structure, also known as a BAT Entry (e.g., the HBAT and SBAT entries as shown in FIG. 4). Therefore, HAs and SAs may have the same number of memory pool entries and BAT entries.

In CCIX, the BAT structure contains one or more entries where the entries are formatted either as base address type entries or fixed offset type entries based on a memory pool addressing capability field in the agent's corresponding memory pool capabilities and status structure. When the memory pool addressing capability field indicated is fixed offset type, the enabled BAT entry is at a fixed offset from the base address of the previous enabled BAT entry associated with a memory pool that has base address type addressing capability.

In FIG. 5, the MemPool0 in IC1 is mapped to the same window in the global address map as the MemPool0 in IC2 and the MemPool0 in IC3. As shown, IC1 includes an HBAT entry that maps MemPool0 in IC1 to the address rang A:C (which may be the address range of the window). In contrast, IC2 has an SBAT entry that maps its MemPool0 to the address range A:B while IC3 has an SBAT entry that maps its MemPool0 to the address range B:C.

Because the ICs are not hardwired in this case, the routing network includes a switch 125 which ensures the correct data is routed to the proper IC. That is, the global address map can configure the switch 125 so that data in the address range A:B received from IC1 is routed to IC2 while data in the address range B:C is routed to IC3.

FIG. 6 illustrates a three IC system where two HAs are mapped to the same window as a single SA. As shown, IC1 and IC2 both have respective HAs (HA1 and HA2). HA1 has MemPool0 which is mapped to address range A:B by an HBAT entry. HA2, on the other hand, has MemPool0 which is mapped to address range B:C. Thus, the window has an combined address range of A:C.

The IC3 has SA3 that has a MemPool0 mapped to address range A:C as shown by its corresponding SBAT entry. For example, the MemPools in IC1 and IC2 may represents a logical size of 4 gigabytes while the MemPool0 in IC3 has a physical size of 8 gigabytes (or more).

The switch 125 routes data traffic received from IC3 in address range A:B to IC1 and the data traffic in address range B:C to IC2. All the traffic received from both IC1 and IC2 is routed to the IC3. Thus, FIG. 6 illustrates a hardware implementation where multiple HAs (and corresponding memory expansion pools) are mapped to a single SA (and corresponding memory pool).

Figure 7:
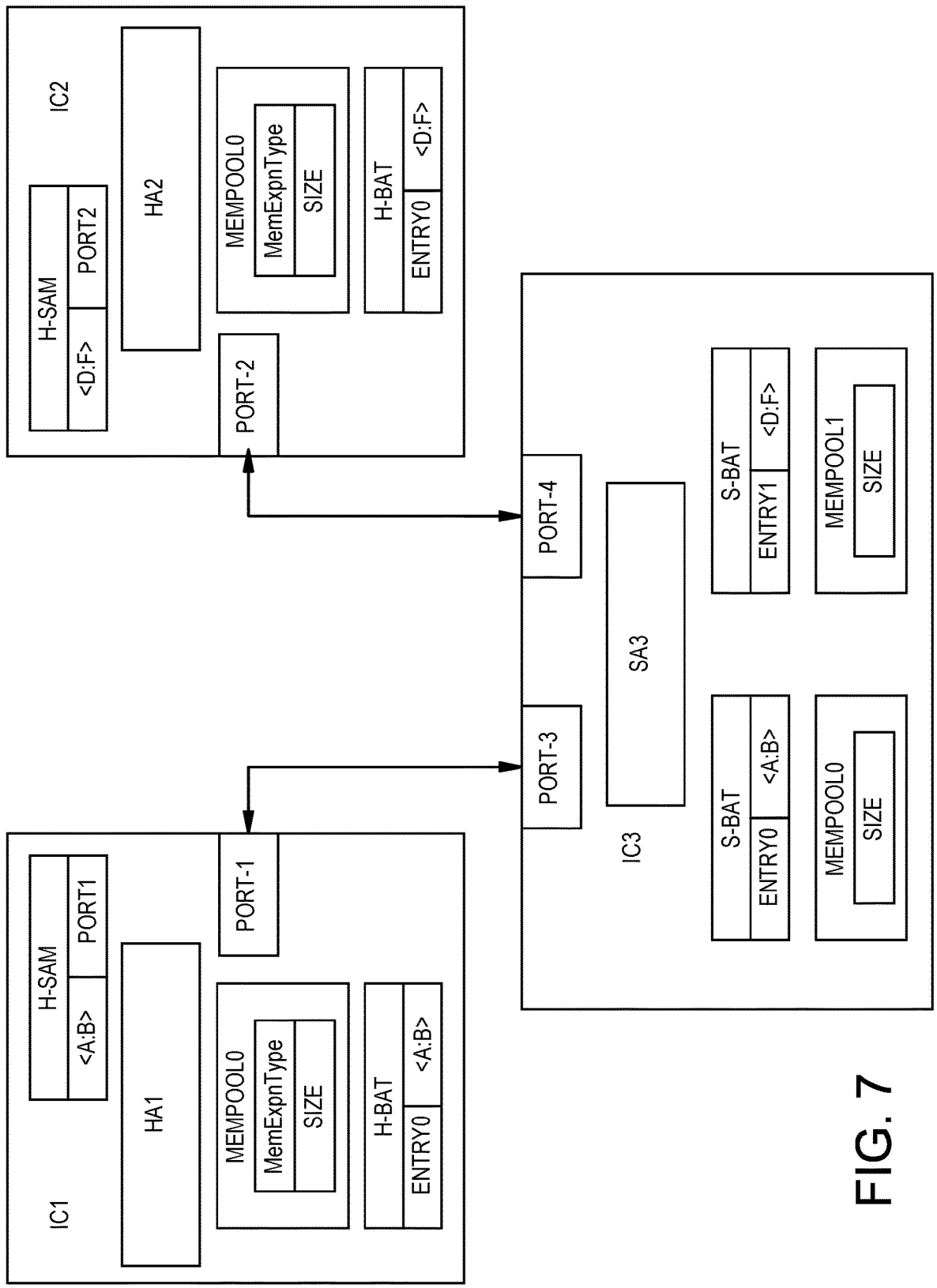

FIG. 7 illustrates two HA ICs (IC1 and IC2) that communicate with one SA IC (IC3) that has two Mem Pools and two Ports. In this type, the SA IC can have both Ports receiving Memory Traffic destined for only one Memory Pool from two HA ICs. As shown, the memory ranges of the two Mem Pools does not need to be contiguous (e.g., A:B and D:F) although it can be. However, in another embodiment, the two HA ICs can communicate with one SA IC that has two Ports but a single Mem Pool. In that case, the memory ranges assigned to the two HAs is contiguous (e.g., the total memory of the Mem Pool is A:C where one HA IC uses A:B and the other uses B:C).

FIGS. 4-7 illustrate four different types of ICs: (A) one HA IC with two Mem Expansion Pools and two Ports (B) one HA IC with one Mem Expansion Pool and one Port (C) One SA IC with one Mem Pool and one Port and (D) one SA IC with two Mem Pools and two Ports. The techniques discussed above allow for the same three example mappings and capabilities illustrated in FIGS. 4-7 to be achieved by different subsets of the same four types of ICs. For example, the Type-A IC with one HA with two Mem Expansion Pools and two Ports can have only one Mem Expansion Pool mapped to one Port that ends up going via a switch to two Type-C SA ICs. In another example, the Type-D SA IC with two Mem Pools and two Ports can have both ports receiving Memory Traffic destined for only one Memory Pool from two HA ICs. In summary, the embodiments herein allow for the creation of logical connection bindings between the memory expansion pools of one or more HAs to the memory pools of one or more SAs not only at configuration time, but the same components can also be reconfigured to create new logical connection bindings at a later time.

Further, the ICs containing the HAs may be ICs forming (or are part of) a processor—e.g., CPU—or accelerator. The ICs containing the SAs, however, IC2 may be ICs disposed on respective SCM cards.

Figure 8:
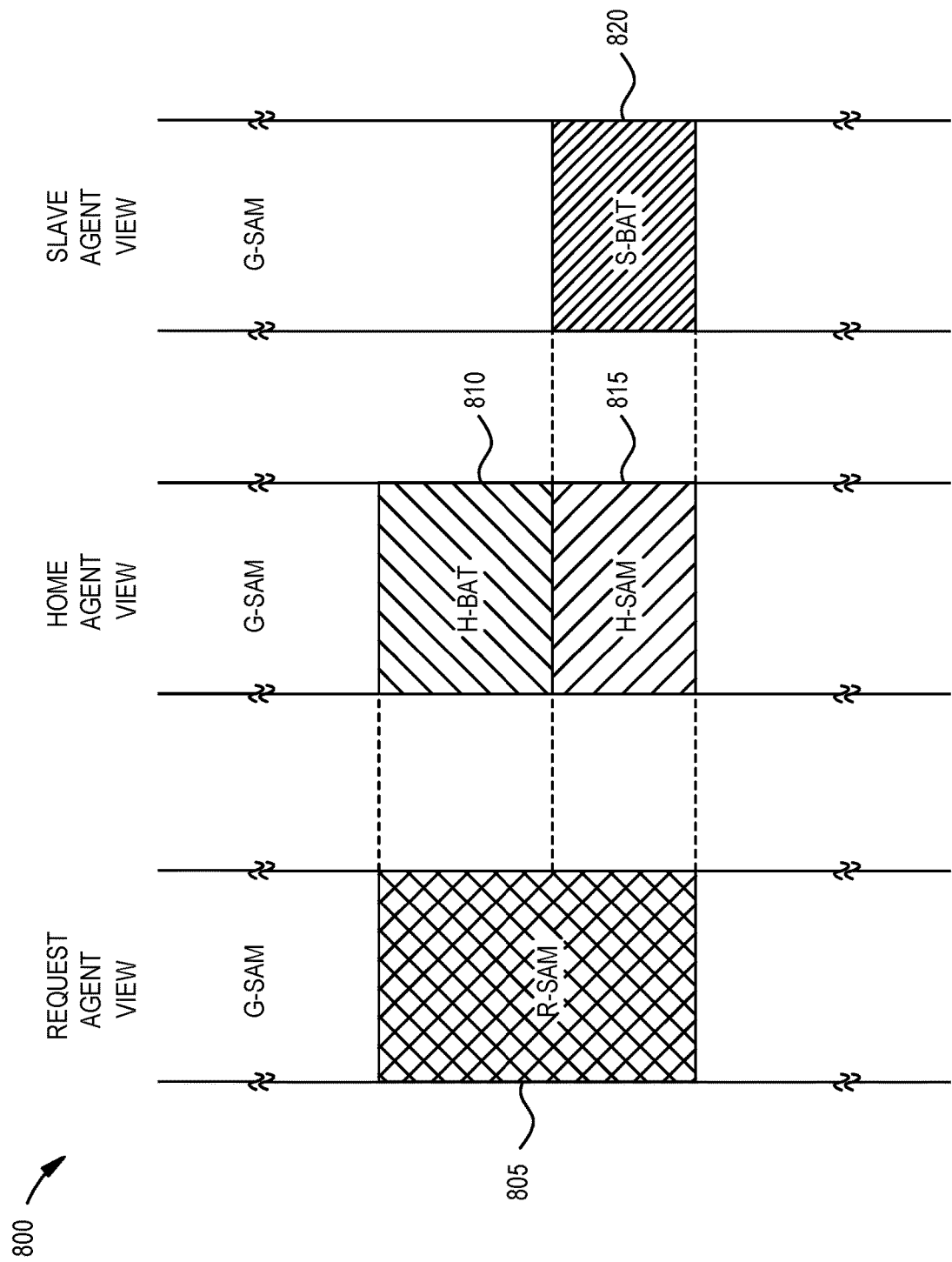
FIG. 8 illustrates various views of a global address map, according to examples.

FIG. 8 illustrates various views of a global address map, according to one or more embodiments. In one embodiment, the global address map 800 is created with different "views" of the address map, depending on the component in the system. A request agent (the coherency or load-store semantics initiator of memory operations) has a Request Agent-System Address Map (R-SAM) 805. The home agent (the coherency or load-store semantics target of memory operations) has either a H-BAT 810 to map request agent accesses to local memory or H-SAM 815 to map request agent accesses to expansion memory. The slave agent (the memory expansion target of memory operations) has a S-BAT 820 to map request agent accesses to expansion memory.

Both the home agent and slave agent have the ability to declare the memory capacity supported via memory pool capability data structures. The memory pool data structures contain attributes of the memory including memory type, capacity/size and, in the case of home agents, whether that memory pool is capable of memory expansion and the capacity/size of memory expansion for that pool. In one embodiment, each memory pool capability data structure has a corresponding BAT control data structure, described as a BAT entry, where the system provides the system address information that maps the G-SAM to that particular memory pool.

In the preceding, reference is made to embodiments of the disclosure. However, the disclosure is not limited to specific described embodiments. Instead, any combination of the preceding features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the preceding aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the users computer, partly on the users computer, as a stand-alone software package, partly on the users computer and partly on a remote computer or entirely on the remote computer or server. In the latter scenario, the remote computer may be connected to the users computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flowchart illustration, can be implemented by special-purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method, comprising:
   identifying a plurality of memory expansion devices;
   identifying a plurality of home agents capable of coherently managing the plurality of memory expansion devices;
   identifying a type of at least one memory pool in each of the plurality of memory expansion devices;
   identifying the plurality of home agents that can manage that type;
   generating a global address map comprising a plurality of windows based on the type of the at least one memory pool in each of the plurality of memory expansion devices and the plurality of home agents that can manage that type, wherein each window maps at least one of the plurality of memory expansion devices to at least one of the plurality of home agents; and
   accessing, by the plurality of home agents, the memory pools in the plurality of memory expansion devices.

2. The method of claim 1, wherein the type of the at least one memory pool in each of the plurality of memory expansion devices is one of volatile or non-volatile memory.

3. The method of claim 1, further comprising:
   identifying a size of the at least one memory pool in each of the plurality of memory expansion devices; and
   identifying an amount of memory that can be managed by each of the plurality of home agents.

4. The method of claim 1, wherein at least two memory pools in a first expansion device of the plurality of memory expansion devices map to a same window in the plurality of windows as a first home agent of the plurality of home agents.

5. The method of claim 1, wherein at least one memory pool in a first expansion device of the plurality of memory expansion devices and at least one memory pool in a second expansion device of the plurality of memory expansion devices map to a same window in the plurality of windows as a first home agent of the plurality of home agents.

6. The method of claim 1, wherein only one memory pool in a first expansion device of the plurality of memory expansion devices maps to a same window in the plurality of windows as a first home agent of the plurality of home agents and a second home agent of the plurality of home agents.

7. The method of claim 1, wherein a plurality of memory pools in multiple ones of the plurality of memory expansion devices maps to a same window in the plurality of windows as a first home agent of the plurality of home agents and a second home agent of the plurality of home agents.

8. The method of claim 1, wherein the plurality of home agents are memory controllers integrated into respective processors.

9. The method of claim 1, wherein the plurality of home agents is each disposed in a different integrated circuit.

10. The method of claim 1, wherein the memory expansion devices are storage class memory (SCM) cards.

11. A computing system, comprising:
a plurality of memory expansion devices comprising different types of memory pools;
a plurality of home agents configured to coherently manage the plurality of memory expansion devices based on the different types of memory pools; and
a global address map comprising a plurality of windows, wherein each window maps at least one of the plurality of memory expansion devices to at least one of the plurality of home agents.

12. The computing system of claim 11, wherein the different types of memory pools include volatile and nonvolatile memory.

13. The computing system of claim 11, wherein at least two memory pools in a first expansion device of the plurality of memory expansion map to a same window in the plurality of windows as a first home agent of the plurality of home agents.

14. The computing system of claim 11, wherein at least one memory pool in a first expansion device of the plurality of memory expansion devices and at least one memory pool in a second expansion device of the plurality of memory expansion devices map to a same window in the plurality of windows as a first home agent of the plurality of home agents.

15. The computing system of claim 11, wherein only one memory pool in a first expansion device of the plurality of memory expansion devices maps to a same window in the plurality of windows as a first home agent of the plurality of home agents and a second home agent of the plurality of home agents.

16. The computing system of claim 11, wherein a plurality of memory pools in multiple ones of the plurality of memory expansion devices maps to a same window in the plurality of windows as a first home agent of the plurality of home agents and a second home agent of the plurality of home agents.

17. The computing system of claim 11, wherein the plurality of home agents are memory controllers integrated into respective processors.

18. The computing system of claim 11, wherein the plurality of home agents is each disposed in a different integrated circuit.

19. A method, comprising:
identifying a plurality of memory expansion devices;
identifying a plurality of home agents capable of coherently managing the plurality of memory expansion devices;
identifying a size of at least one memory pool in each of the plurality of memory expansion devices;
identifying an amount of memory that can be managed by each of the plurality of home agents;
generating a global address map comprising a plurality of windows based on the size of the at least one memory pool in each of the plurality of memory expansion devices and the amount of memory that can be managed by each of the plurality of home agents, wherein each window maps at least one of the plurality of memory expansion devices to at least one of the plurality of home agents; and
accessing, by the plurality of home agents, the memory pools in the plurality of memory expansion devices.

20. The method of claim 19, wherein at least two memory pools in a first expansion device of the plurality of memory expansion devices map to a same window in the plurality of windows as a first home agent of the plurality of home agents.

* * * * *